US 12,242,282 B2

United States Patent
Cobar et al.

(10) Patent No.: US 12,242,282 B2
(45) Date of Patent: Mar. 4, 2025

(54) PIXEL-BY-PIXEL SEGMENTATION OF AERIAL IMAGERY FOR AUTONOMOUS VEHICLE CONTROL

(71) Applicant: WING AVIATION LLC, Mountain View, CA (US)

(72) Inventors: Christopher Cobar, Mountain View, CA (US); Jeremie Gabor, Mountain View, CA (US); Ali Shoeb, San Rafael, CA (US)

(73) Assignee: Wing Aviation LLC, Palo Alto, CA (US)

( * ) Notice: Subject to any disclaimer, the term of this patent is extended or adjusted under 35 U.S.C. 154(b) by 244 days.

(21) Appl. No.: 17/946,972

(22) Filed: Sep. 16, 2022

(65) Prior Publication Data
US 2024/0094743 A1 Mar. 21, 2024

(51) Int. Cl.
*G05D 1/00* (2024.01)
*B64C 39/02* (2023.01)
*B64U 101/30* (2023.01)
*G06V 10/75* (2022.01)
*G06V 20/17* (2022.01)

(52) U.S. Cl.
CPC ......... *G05D 1/0676* (2013.01); *B64C 39/024* (2013.01); *G05D 1/0808* (2013.01); *G05D 1/101* (2013.01); *G06V 10/751* (2022.01); *G06V 20/17* (2022.01); *B64U 2101/30* (2023.01); *B64U 2201/10* (2023.01)

(58) Field of Classification Search
CPC .............................. G05D 1/0676; G06V 20/17
USPC .......................................................... 701/16
See application file for complete search history.

(56) References Cited

U.S. PATENT DOCUMENTS

2020/0130864 A1* 4/2020 Brockers ................. B64F 1/007
2020/0301445 A1* 9/2020 Jourdan ................. B64U 80/25

FOREIGN PATENT DOCUMENTS

WO 2022180276 A1 9/2022

OTHER PUBLICATIONS

Howard, A.G., et al., "MobileNets: Efficient Convolutional Neural Networks for Mobile Vision Applications," arXiv:1704.04861v1 [cs.CV], Apr. 17, 2017, 9 pages.

(Continued)

*Primary Examiner* — Todd Melton
*Assistant Examiner* — Vincent Feng
(74) *Attorney, Agent, or Firm* — Christensen O'Connor Johnson Kindness PLLC (57) ABSTRACT

In some embodiments, an unmanned aerial vehicle (UAV) is provided. The UAV comprises one or more processors; a camera; one or more propulsion devices; and a computer-readable medium having instructions stored thereon that, in response to execution by the one or more processors, cause the UAV to perform actions comprising: receiving at least one image captured by the camera; generating labels for pixels of the at least one image by providing the at least one image as input to a machine learning model; identifying one or more landing spaces in the at least one image based on the labels; determining a relative position of the UAV with respect to the one or more landing spaces; and transmitting signals to the one or more propulsion devices based on the relative position of the UAV with respect to the one or more landing spaces.

20 Claims, 8 Drawing Sheets

(56) References Cited

OTHER PUBLICATIONS

Wu et al., "Towards a consequences-aware emergency landing system for unmanned aerial systems", 2018 International Conference on Unmanned Aircraft Systems (ICUAS), Dallas, TX, IEEE, Jun. 2018, pp. 1025-1030.

International Search Report and Written Opinion, mail date Nov. 8, 2023, in corresponding International Patent Application No. PCT/US2023/030250, 14 pages.

* cited by examiner

PIXEL-BY-PIXEL SEGMENTATION OF AERIAL IMAGERY FOR AUTONOMOUS VEHICLE CONTROL

TECHNICAL FIELD

This disclosure relates generally to unmanned aerial vehicles (UAVs), and in particular but not exclusively, relates to autonomous control of UAVs using imagery captured by cameras of the UAVs.

BACKGROUND

As fleets of UAVs, also referred to as drones, are enlisted for small package deliveries, aerial photography, public safety, etc., UAVs will operate in increasing numbers and with increasing frequency to meet customer demand. For UAVs, a typical mission may include steps such as departing from a landing space, performing multiple stops at one or more locations, and returning to a landing space (either the same landing space from which it departed or a different landing space).

When underway, a UAV may typically estimate or determine its position using a Global Navigation Satellite System (GNSS), such as the Global Positioning System (GPS). However, GNSS may not be effective for all positioning tasks for UAVs. For example, near ground level, GNSS signals may have a greater error or be considered invalid. As another example, position errors may be introduced into GNSS signals caused by reflections of signals from nearby structures and/or geographic features. As yet another example, wind gusts and other dynamic environmental factors may affect a UAV's position at a time scale more dynamic than a time scale for refreshing GNSS position data.

One backup or complementary technique for positioning for UAVs involves the use of cameras mounted to the UAVs in order to obtain imagery, and then using objects detected in the imagery for positioning. One example technique uses geofiducials mounted in known locations, which can then be recognized in the imagery and used to determine positions. The term "geofiducial" in this context refers to a calibrated, artificial geographical reference for which the precise location and orientation is known. An example that uses visual patterns to encode a precise location, orientation, and identity of the geofiducial is an "AprilTag" as developed by the APRIL robotics lab at the University of Michigan. Reference to one or more geofiducials can be used to determine a precise position for a UAV, wherein the UAV is configured to detect and decode the information represented by the geofiducial from captured imagery.

While geofiducials can be useful for positioning, there are nevertheless drawbacks. For example, since UAVs operate at a variety of altitudes, geofiducials are not always usefully visible even if a portion is within the field of view of a camera. That is, the UAV may be at too high of an altitude for a geofiducial to be imaged at a high-enough resolution to be interpreted, or at too low of an altitude for the entire geofiducial to be visible within the field of view of the camera. Another drawback is that detecting and interpreting content of a geofiducial is a complex computer vision task that often uses techniques that are fragile with respect to changing lighting conditions, reflections, shadows, and other environmental conditions that are likely to be present. Finally, in order to properly understand a position of a landing space associated with a geofiducial without visually identifying the landing space itself, the geofiducial and landing space must be positioned in relation to each other with sub-meter accuracy, which is a difficult and time consuming process.

What is desired are techniques that are capable of using other types of features for visual positioning, wherein the techniques are efficient and are robust to changing environmental conditions.

BRIEF SUMMARY

In some embodiments, a non-transitory computer-readable medium having computer-executable instructions stored thereon is provided. The instructions, in response to execution by one or more processors of an unmanned aerial vehicle (UAV), cause the UAV to perform actions comprising: receiving at least one image captured by a camera of the UAV; generating labels for pixels of the at least one image by providing the at least one image as input to a machine learning model, wherein the labels include an unoccupied landing space pixel label, an occupied landing space pixel label, and a non-landing space pixel label; identifying one or more landing spaces in the at least one image based on the labels; determining a relative position of the UAV with respect to the one or more landing spaces; and transmitting signals to one or more propulsion devices of the UAV based on the relative position of the UAV with respect to the one or more landing spaces.

In some embodiments, an unmanned aerial vehicle (UAV) is provided. The UAV comprises one or more processors; a camera; one or more propulsion devices; and a non-transitory computer-readable medium having computer-executable instructions stored thereon. The instructions, in response to execution by the one or more processors, cause the UAV to perform actions comprising: receiving at least one image captured by the camera; generating labels for pixels of the at least one image by providing the at least one image as input to a machine learning model, wherein the labels include an unoccupied landing space pixel label, an occupied landing space pixel label, and a non-landing space pixel label; identifying one or more landing spaces in the at least one image based on the labels; determining a relative position of the UAV with respect to the one or more landing spaces; and transmitting signals to the one or more propulsion devices based on the relative position of the UAV with respect to the one or more landing spaces.

BRIEF DESCRIPTION OF THE SEVERAL VIEWS OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described. To easily identify the discussion of any particular element or act, the most significant digit or digits in a reference number refer to the figure number in which that element is first introduced.

DETAILED DESCRIPTION

In embodiments of the present disclosure, a UAV uses machine learning models to process camera images to detect landing spaces. In some embodiments, the landing spaces may be associated with a charging pad which can inductively charge batteries of the UAV once the UAV lands thereon, such that the machine learning models are configured to detect charging pads in the camera images. To improve the precision and the robustness of the detection, the machine learning models in embodiments of the present disclosure apply pixel-by-pixel labels to the images to associate the pixels with either depicting a landing space or not depicting a landing space, and heuristics may then be applied to groups of labeled pixels to detect actual landing spaces in the imagery. Upon identifying a landing space, the location of the landing space in the imagery may be used to help control the position of the UAV. For example, in some embodiments, the machine learning models may further label pixels as pixels for occupied landing spaces and unoccupied landing spaces in order to help plan a path to an unoccupied landing space.

Figure 1A:
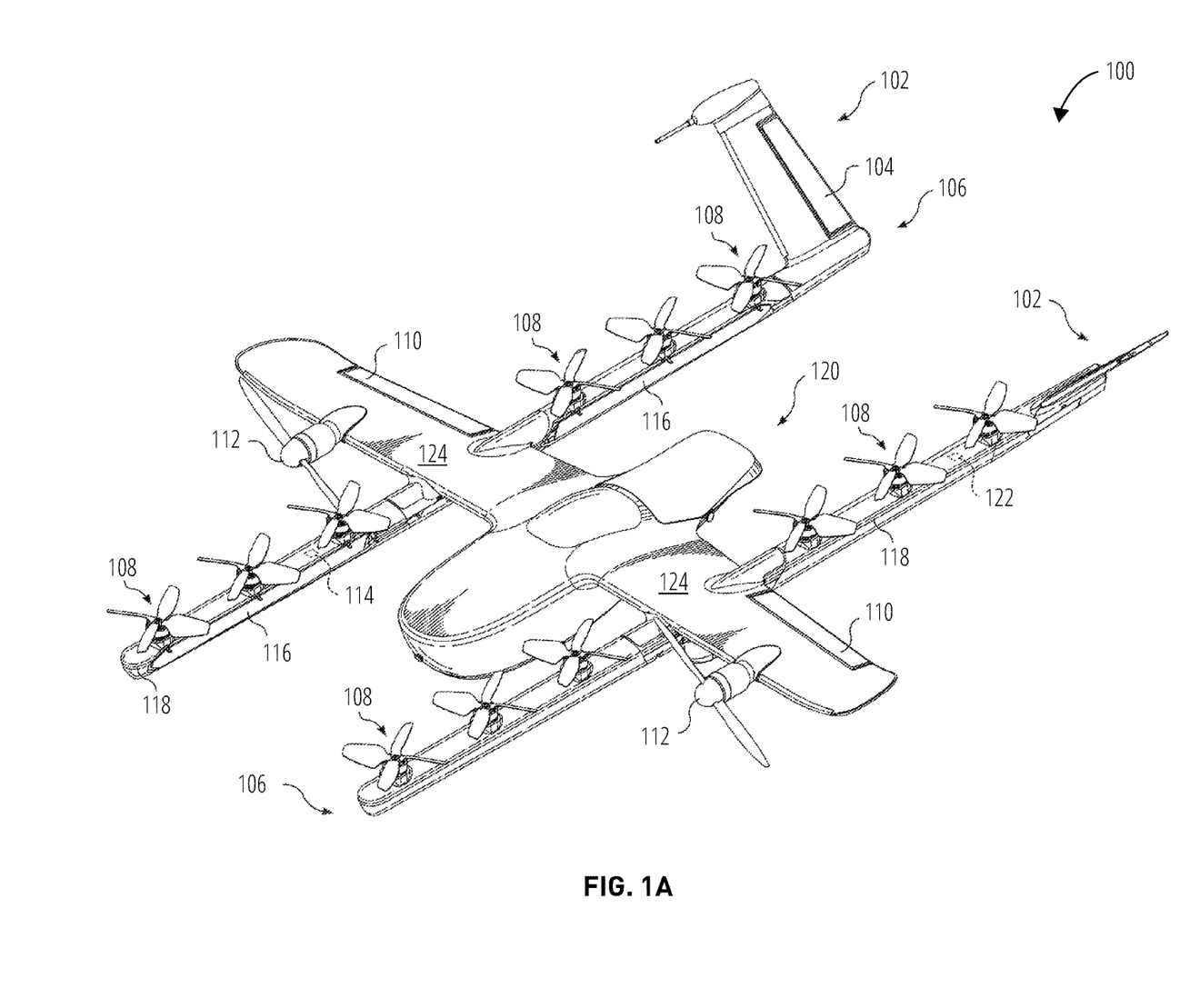
FIG. 1A and FIG. 1B illustrate a UAV 100 in accordance with one embodiment.
Figure 1B:
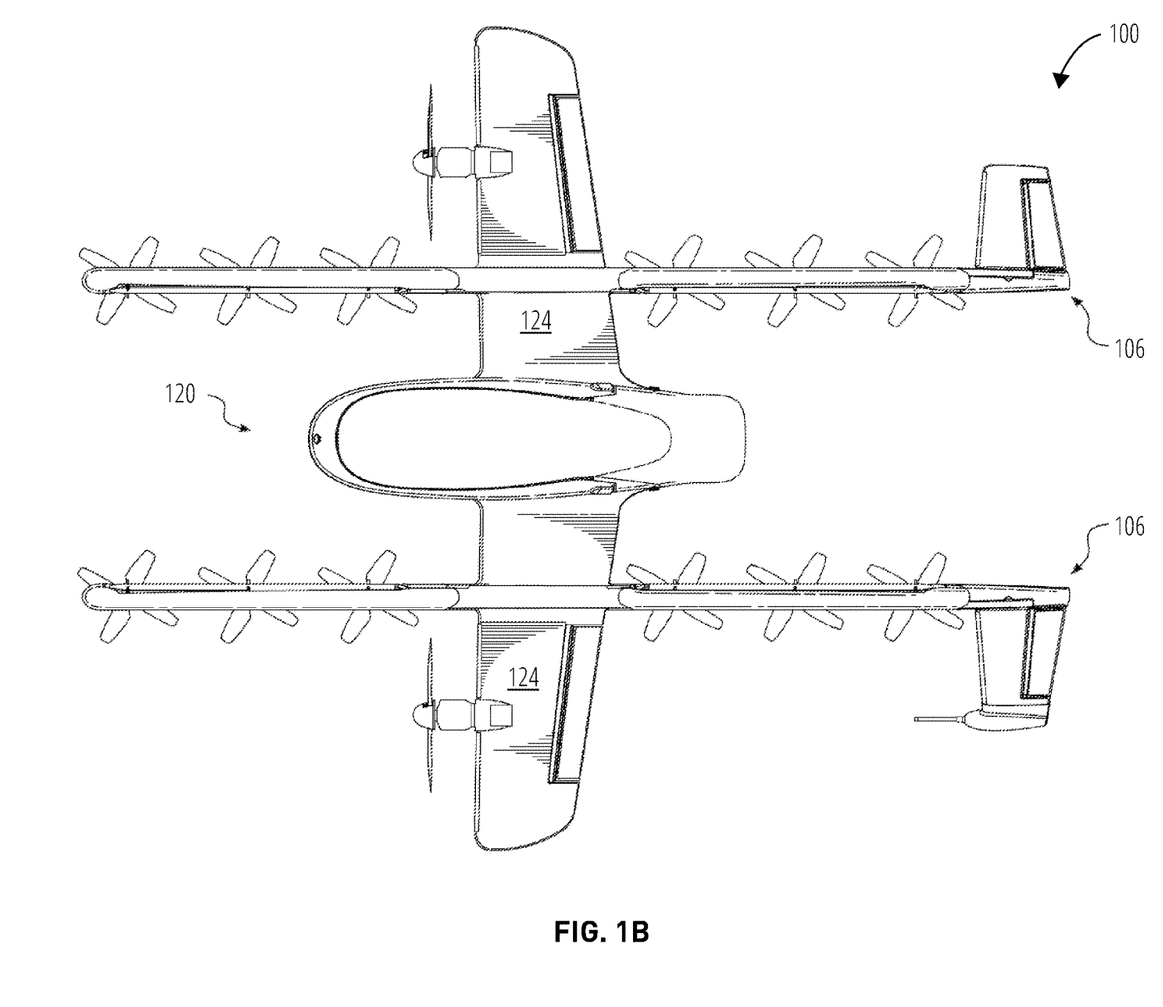

FIG. 1A and FIG. 1B illustrate an aerial vehicle or UAV 100, in accordance with an embodiment of the present disclosure. The illustrated embodiment of UAV 100 is a vertical takeoff and landing (VTOL) unmanned aerial vehicle (UAV) that includes separate propulsion units 112 and propulsion units 108 for providing horizontal and vertical propulsion, respectively. UAV 100 is a fixed-wing aerial vehicle, which as the name implies, has a wing assembly 124 that can generate lift based on the wing shape and the vehicle's forward airspeed when propelled horizontally by propulsion units 112. FIG. 1A is a perspective top view illustration of UAV 100 while FIG. 1B is a bottom side plan view illustration of UAV 100.

The illustrated embodiment of UAV 100 includes a fuselage 120. In one embodiment, fuselage 120 is modular and includes a battery module, an avionics module, and a mission payload module. These modules are detachable from each other and mechanically securable to each other to contiguously form at least a portion of the fuselage 120 or UAV main body.

Figure 2:
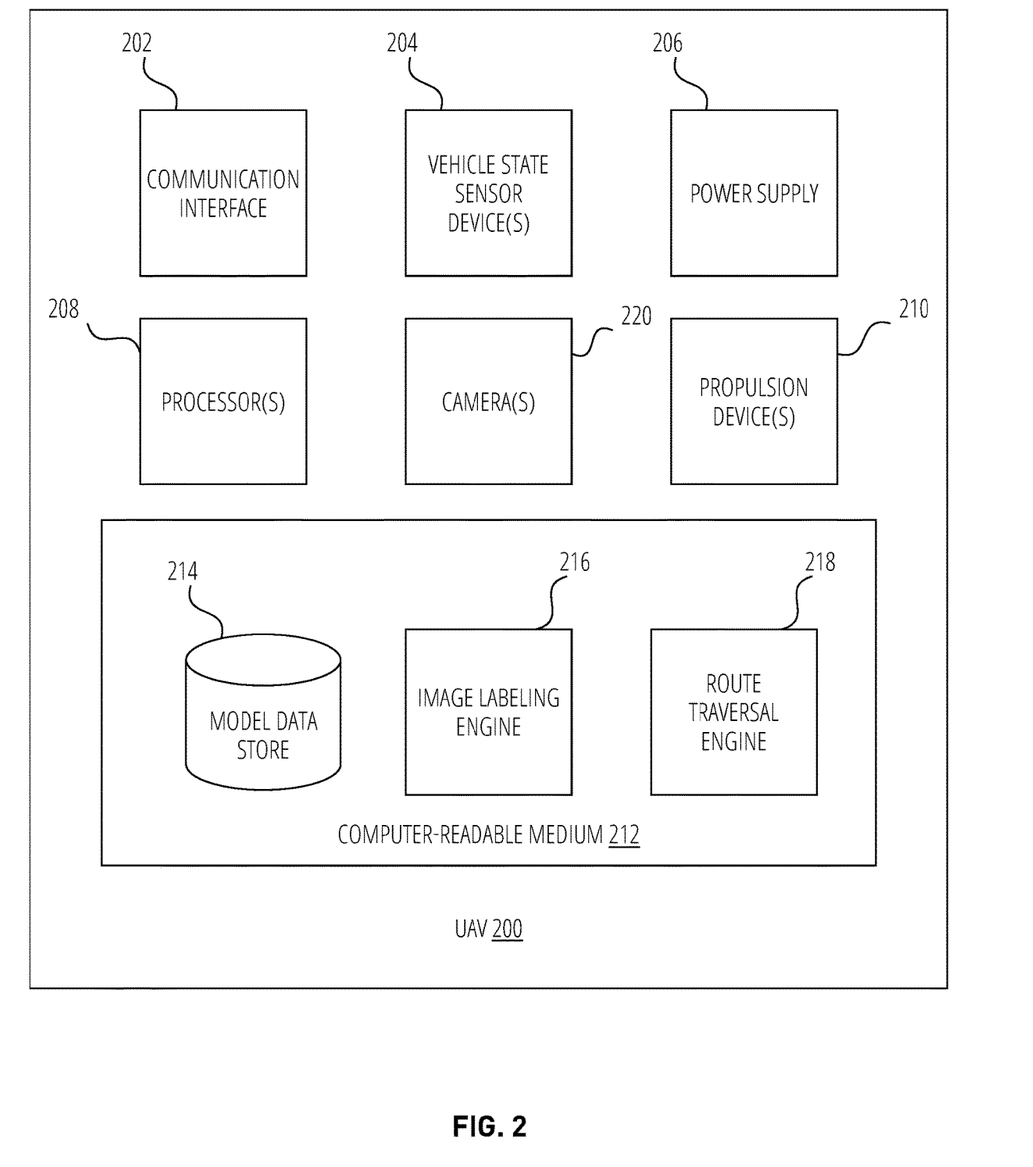
FIG. 2 is a block diagram that illustrates various components of a non-limiting example embodiment of a UAV according to various aspects of the present disclosure.

The battery module includes a cavity for housing one or more batteries for powering UAV 100. The avionics module houses flight control circuitry of UAV 100, which may include a processor and memory, communication electronics and antennas (e.g., cellular transceiver, Wi-Fi transceiver, etc.), and various sensors (e.g., global positioning sensor, an inertial measurement unit (IMU), a magnetic compass, etc.). The mission payload module houses equipment associated with a mission of UAV 100. For example, the mission payload module may include a payload actuator for holding and releasing an externally attached payload. In another embodiment, the mission payload module may include a camera/sensor equipment holder for carrying camera/sensor equipment (e.g., camera, lenses, radar, LIDAR, pollution monitoring sensors, weather monitoring sensors, etc.). Other components that may be carried by some embodiments of the UAV 100 are illustrated in FIG. 2.

The illustrated embodiment of UAV 100 further includes horizontal propulsion units 112 positioned on wing assembly 124, which can each include a motor, shaft, motor mount, and propeller, for propelling UAV 100. The illustrated embodiment of UAV 100 includes two boom assemblies 106 that secure to wing assembly 124.

The illustrated embodiments of boom assemblies 106 each include a boom housing 118 in which a boom is disposed, vertical propulsion units 108, printed circuit boards 116, and stabilizers 102. Vertical propulsion units 108 can each include a motor, shaft, motor mounts, and propeller, for providing vertical propulsion. Vertical propulsion units 108 may be used during a hover mode where UAV 100 is descending (e.g., to a delivery location) or ascending (e.g., following a delivery). Stabilizers 102 (or fins) may be included with UAV 100 to stabilize the UAV's yaw (left or right turns) during flight. In some embodiments, UAV 100 may be configured to function as a glider. To do so, UAV 100 may power off its propulsion units and glide for a period of time.

During flight, UAV 100 may control the direction and/or speed of its movement by controlling its pitch, roll, yaw, and/or altitude. For example, the stabilizers 102 may include one or more rudders 104 for controlling the UAV's yaw, and wing assembly 124 may include elevators for controlling the UAV's pitch and/or ailerons 110 for controlling the UAV's roll. As another example, increasing or decreasing the speed of all the propellers simultaneously can result in UAV 100 increasing or decreasing its altitude, respectively. The UAV 100 may also include components for sensing the environment around the UAV 100, including but not limited to audio sensor 122 and audio sensor 114. Further examples of sensor devices are illustrated in FIG. 2 and described below.

Many variations on the illustrated fixed-wing aerial vehicle are possible. For instance, aerial vehicles with more wings (e.g., an "x-wing" configuration with four wings), are also possible. Although FIG. 1A and FIG. 1B illustrate one wing assembly 124, two boom assemblies 106, two horizontal propulsion units 112, and six vertical propulsion units 108 per boom assembly 106, it should be appreciated that other variants of UAV 100 may be implemented with more or fewer of these components.

It should be understood that references herein to an "unmanned" aerial vehicle or UAV can apply equally to autonomous and semi-autonomous aerial vehicles. In a fully autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator may control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

FIG. 2 is a block diagram that illustrates various components of a non-limiting example embodiment of a UAV according to various aspects of the present disclosure. The UAV 200 illustrated in FIG. 2 may be the same as the UAV 100 illustrated in FIG. 1A and FIG. 1B, with FIG. 2 schematically illustrating some of the components of the UAV 100. The UAV 200 is configured to capture imagery using one or more cameras, label pixels in the images as being associated with landing spaces, and using detected landing spaces to control aspects of the operation of the UAV 200. As shown, the UAV 200 includes a communication interface 202, one or more vehicle state sensor devices 204, a power supply 206, one or more processors 208, one or more propulsion devices 210, one or more cameras 220, and a computer-readable medium 212.

In some embodiments, the communication interface 202 includes hardware and software to enable any suitable communication technology for communicating with other components, including but not limited to a model management computing system 310 as described below. In some embodiments, the communication interface 202 includes multiple communication interfaces, each for use in appropriate circumstances. For example, the communication interface 202 may include a long-range wireless interface such as a 4G or LTE interface, or any other type of long-range wireless interface (e.g., 2G, 3G, 5G, or WiMAX), to be used to communicate with the model management computing system 310 or other fleet management systems while traversing a route. The communication interface 202 may also include a medium-range wireless interface such as a Wi-Fi interface to be used when the UAV 200 is at an area near a start location or an endpoint where Wi-Fi coverage is available. The communication interface 202 may also include a short-range wireless interface such as a Bluetooth interface to be used when the UAV 200 is in a maintenance location or is otherwise stationary and waiting to be assigned a route. The communication interface 202 may also include a wired interface, such as an Ethernet interface or a USB interface, which may also be used when the UAV 200 is in a maintenance location or is otherwise stationary and waiting to be assigned a route.

In some embodiments, the vehicle state sensor devices 204 are configured to detect states of various components of the UAV 200, and to transmit signals representing those states to other components of the UAV 200. Some non-limiting examples of a vehicle state sensor device 204 include a battery state sensor and a propulsion device health sensor.

In some embodiments, the power supply 206 may be any suitable device or system for storing and/or generating power. Some non-limiting examples of a power supply 206 include one or more batteries, one or more solar panels, a fuel tank, and combinations thereof. In some embodiments, the power supply 206 may include an inductive charging unit that allows a battery of the power supply 206 to be recharged when the UAV 200 is resting on an charging pad.

In some embodiments, the propulsion devices 210 may include any suitable devices for causing the UAV 200 to travel along the path. For example, the propulsion device 210 may include devices such as, but not limited to, one or more motors, one or more propellers, and one or more flight control surfaces.

In some embodiments, the cameras 220 include one or more cameras positioned to capture imagery of areas surrounding the UAV 200. For example, a camera 220 may be positioned vertically to capture imagery directly beneath the UAV 200. As another example, a camera 220 may be positioned at the front of the UAV 200 and angled forward to capture imagery in the direction of travel of the UAV 200. The camera 220 may have a telephoto lens in order to maximize captured detail and minimize geometric distortions, a wide angle lens in order to maximize the captured area, or any other type of lens. Further, the camera 220 may capture imagery within the visible light spectrum or a non-visible light spectrum (including but not limited to infrared), and may capture imagery in two dimensions or three dimensions.

In some embodiments, the processors 208 may include any type of computer processor capable of receiving signals from other components of the UAV 200 and executing instructions stored on the computer-readable medium 212. In some embodiments, the processors 208 may include one or more general purpose processors. In some embodiments, the processors 208 may include one or more special purpose processors, including but not limited to graphical processing units (GPUs), vision processing units (VPUs), tensor processing units (TPUs), and/or other processors specially adapted to efficiently perform specific types of computations. In some embodiments, the computer-readable medium 212 may include one or more devices capable of storing information for access by the processor 208. In some embodiments, the computer-readable medium 212 may include one or more of a hard drive, a flash drive, an EEPROM, and combinations thereof. In some embodiments, the functionality of one or more of the processors 208 and the computer-readable medium 212 may be combined into a single device, including but not limited to an application-specific integrated circuit (ASIC) or a field-programmable gate array (FPGA).

As shown, the computer-readable medium 212 has stored thereon a model data store 214, an image labeling engine 216, and a route traversal engine 218. In some embodiments, the image labeling engine 216 is configured to process images captured by the cameras 220 using a model stored in the model data store 214 in order to detect landing spaces in the imagery. In some embodiments, the route traversal engine 218 is configured to cause the propulsion devices 210 to control positions of the UAV 200 based on the locations of landing spaces detected by the image labeling engine 216.

Figure 3:
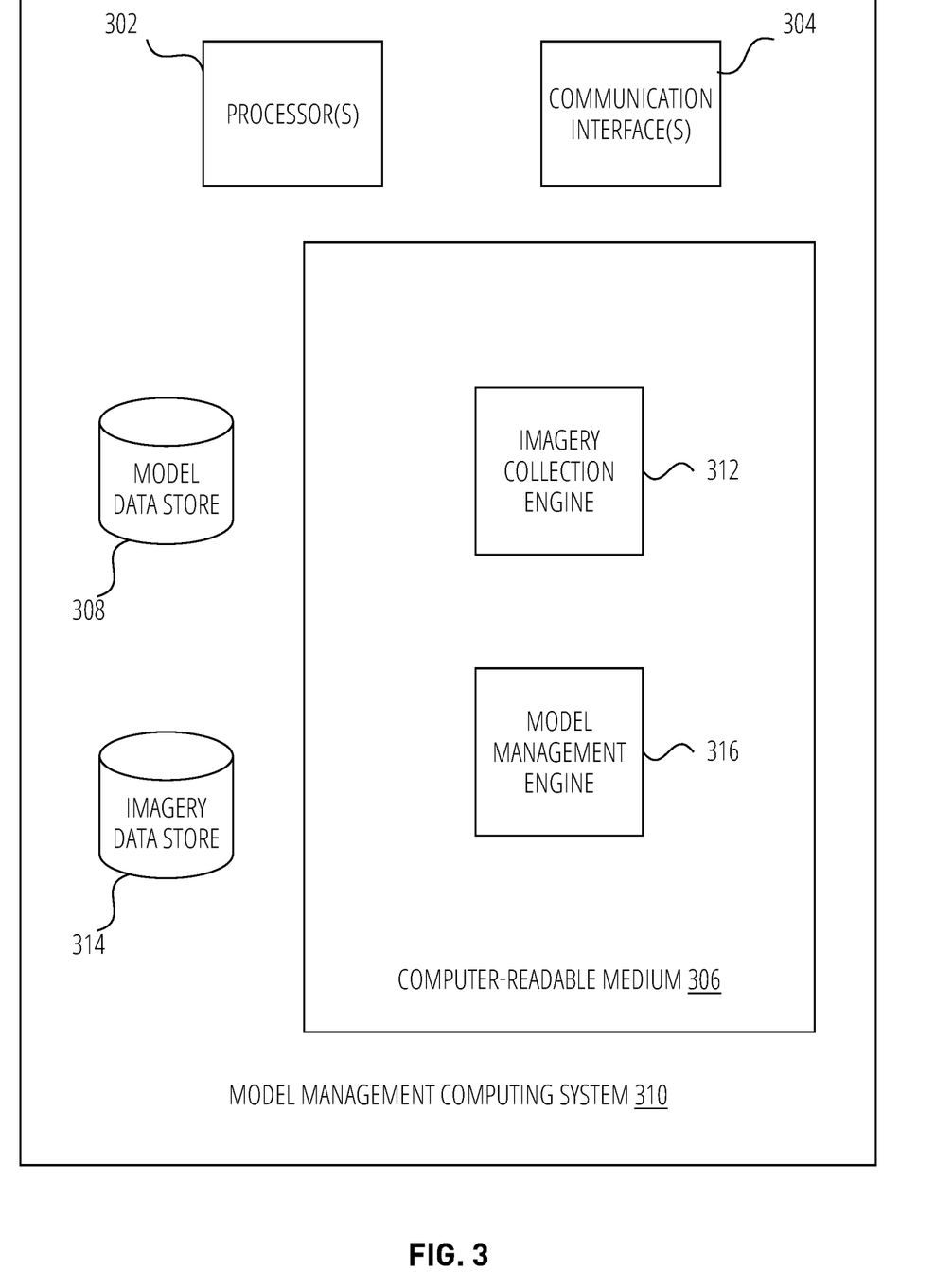
FIG. 3 is a block diagram that illustrates aspects of a non-limiting example embodiment of a model management computing system according to various aspects of the present disclosure.

FIG. 3 is a block diagram that illustrates aspects of a non-limiting example embodiment of a model management computing system according to various aspects of the present disclosure. The illustrated model management computing system 310 may be implemented by any computing device or collection of computing devices, including but not limited to a desktop computing device, a laptop computing device, a mobile computing device, a server computing device, a computing device of a cloud computing system, and/or combinations thereof. The model management computing system 310 is configured to train one or more machine learning models to detect landing spaces in imagery captured by UAVs 200.

As shown, the model management computing system 310 includes one or more processors 302, one or more communication interfaces 304, a model data store 308, an imagery data store 314, and a computer-readable medium 306.

In some embodiments, the processors 302 may include any suitable type of general-purpose computer processor. In some embodiments, the processors 302 may include one or more special-purpose computer processors or AI accelerators optimized for specific computing tasks, including but not limited to graphical processing units (GPUs), vision processing units (VPUs), and tensor processing units (TPUs).

In some embodiments, the communication interfaces 304 include one or more hardware and or software interfaces suitable for providing communication links between components. The communication interfaces 304 may support one or more wired communication technologies (including but not limited to Ethernet, FireWire, and USB), one or more wireless communication technologies (including but not limited to Wi-Fi, WiMAX, Bluetooth, 2G, 3G, 4G, 5G, and LTE), and/or combinations thereof.

As shown, the computer-readable medium 306 has stored thereon logic that, in response to execution by the one or more processors 302, cause the model management computing system 310 to provide an imagery collection engine 312 and a model management engine 316.

As used herein, "computer-readable medium" refers to a removable or nonremovable device that implements any technology capable of storing information in a volatile or non-volatile manner to be read by a processor of a computing device, including but not limited to: a hard drive; a flash memory; a solid state drive; random-access memory (RAM); read-only memory (ROM); a CD-ROM, a DVD, or other disk storage; a magnetic cassette; a magnetic tape; and a magnetic disk storage.

In some embodiments, the imagery collection engine 312 is configured to receive imagery captured by one or more UAVs 200 (or from other sources), and to store the captured imagery in the imagery data store 314. The imagery collection engine 312 is also configured to receive ground truth pixel labels, and to store the ground truth pixel labels along with the labeled images in the imagery data store 314 to create training data. The model management engine 316 is configured to train one or more machine learning models based on the training data stored in the imagery data store 314, to store the trained machine learning models in the model data store 308, and to distributed the trained machine learning models to the UAVs 200.

Further description of the configuration of each of these components is provided below.

As used herein, "engine" refers to logic embodied in hardware or software instructions, which can be written in one or more programming languages, including but not limited to C, C++, C #, COBOL, JAVA™, PHP, Perl, HTML, CSS, JavaScript, VBScript, ASPX, Go, and Python. An engine may be compiled into executable programs or written in interpreted programming languages. Software engines may be callable from other engines or from themselves. Generally, the engines described herein refer to logical modules that can be merged with other engines, or can be divided into sub-engines. The engines can be implemented by logic stored in any type of computer-readable medium or computer storage device and be stored on and executed by one or more general purpose computers, thus creating a special purpose computer configured to provide the engine or the functionality thereof. The engines can be implemented by logic programmed into an application-specific integrated circuit (ASIC), a field-programmable gate array (FPGA), or another hardware device.

As used herein, "data store" refers to any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, such as a hard disk drive, a flash memory, RAM, ROM, or any other type of computer-readable storage medium. One of ordinary skill in the art will recognize that separate data stores described herein may be combined into a single data store, and/or a single data store described herein may be separated into multiple data stores, without departing from the scope of the present disclosure.

Figure 4:
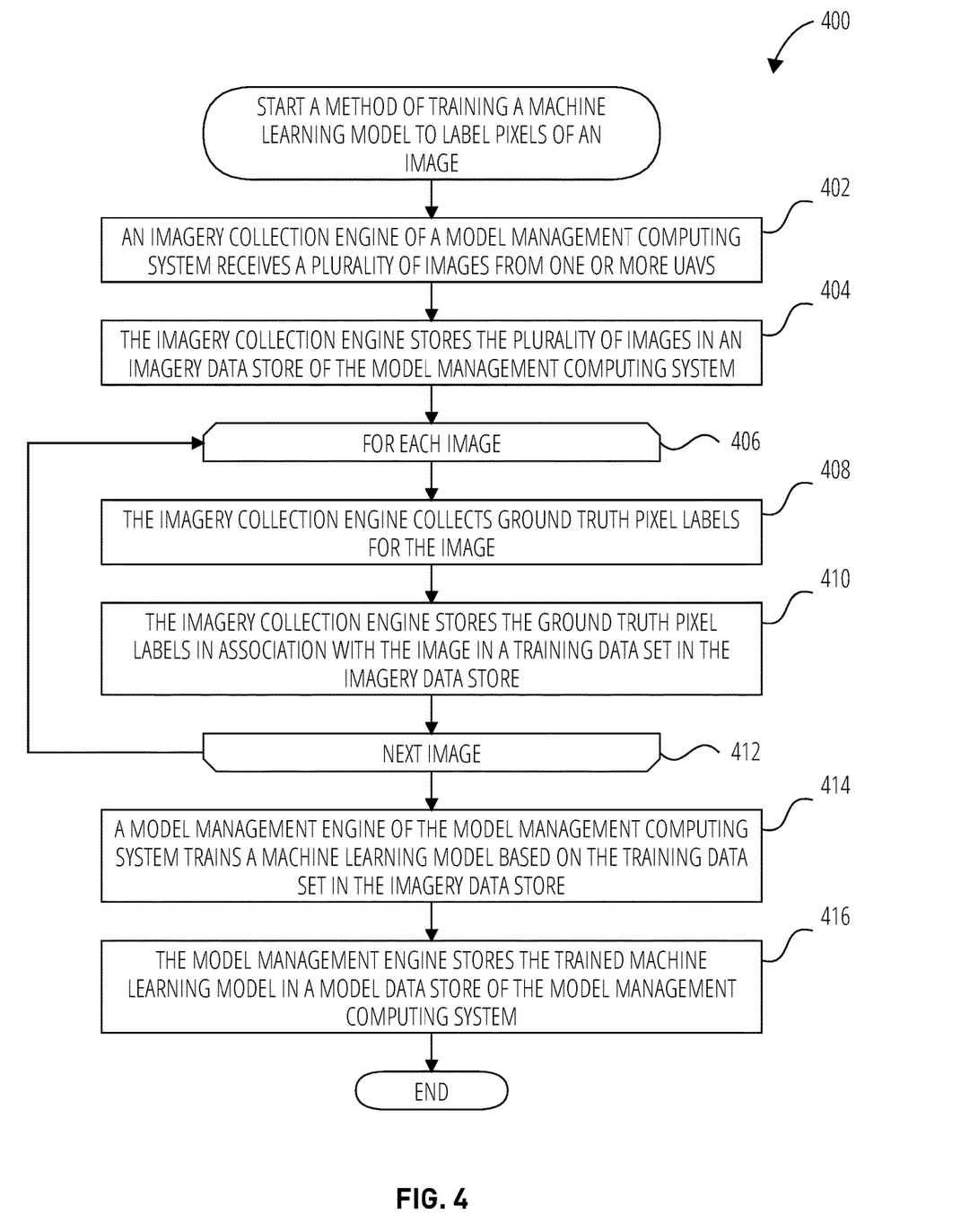
FIG. 4 is a flowchart that illustrates a non-limiting example embodiment of a method of training a machine learning model to label pixels of an image according to various aspects of the present disclosure.

FIG. 4 is a flowchart that illustrates a non-limiting example embodiment of a method of training a machine learning model to label pixels of an image according to various aspects of the present disclosure.

From a start block, the method 400 proceeds to block 402, where an imagery collection engine 312 of a model management computing system 310 receives a plurality of images from one or more UAVs 200. In some embodiments, the UAVs 200 may transmit imagery to the imagery collection engine 312 as still images or video. In some embodiments, the UAVs 200 may transmit telemetry information to be associated with the image, including but not limited to a heading, a pitch, a yaw, and an altitude of the UAV 200 at a time when the image was captured.

In some embodiments, the UAVs 200 may transmit the imagery via a long-range wireless interface while in flight. In some embodiments, the UAVs 200 may transmit the imagery via a medium-range wireless interface, a short-range wireless interface, a wired interface, or via exchange of a removable computer-readable medium after landing at a landing space.

At block 404, the imagery collection engine 312 stores the plurality of images in an imagery data store 314 of the model management computing system 310. In some embodiments, the plurality of images may be stored in temporal order, particularly if the plurality of images was received as video, such that multiple images captured in succession may be processed together.

Figure 5A:
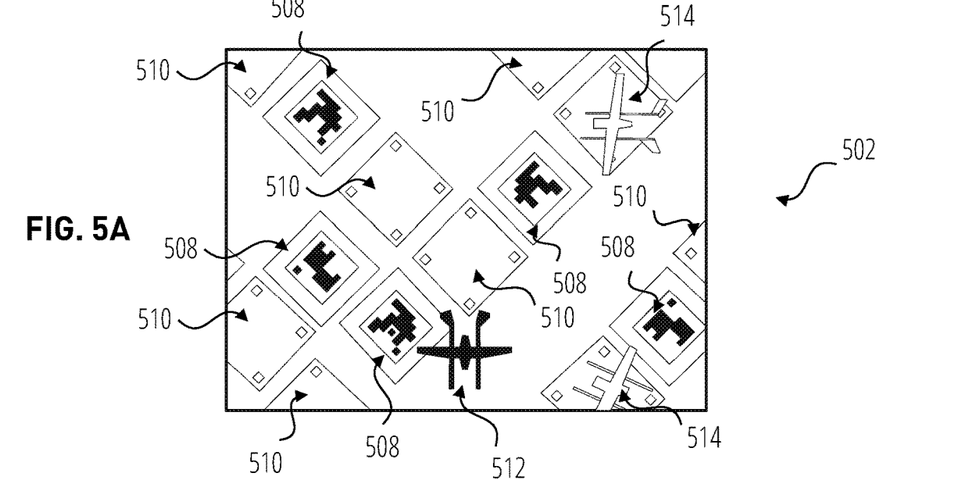
FIG. 5A-FIG. 5C illustrate the application of pixel labels to an aerial image that depicts landing spaces according to various aspects of the present disclosure.

FIG. 5A illustrates an example of an image 502 that may be received by the imagery collection engine 312 from a UAV 200. The image 502 depicts a portion of an operating "nest," or a collection of landing spaces, from which UAVs are arriving and departing. The nest includes a plurality of unoccupied landing spaces 510, a plurality of occupied landing spaces 514, and a plurality of geofiducials 508. In the depicted nest, the location of each landing space is defined by a charging pad on which a UAV may land in order to inductively charge.

The image 502 illustrates some of the challenges that can be encountered while detecting landing spaces in images of nests captured by UAVs using traditional techniques such as classifier models (e.g., convolutional neural networks) that are trained to detect objects in images. For example, only the unoccupied landing spaces 510 located in the center of the image 502 are fully visible. Otherwise, the unoccupied landing spaces 510 around the perimeter of the image 502 are not fully visible, which is likely to confuse classifier models even though the unoccupied landing spaces 510 around the perimeter should still be correctly identified. The image 502 also shows a shadow 512 of a UAV 200, which is likely to be common over the nest during sunny weather and is also likely to confuse classifier models. Though the features of FIG. 5A are clearly visible (i.e., the features are depicted as visible with solid lines), one will recognize that in other real-world images captured by UAVs 200, environmental factors such as haze, motion artifacts, sun glare, low resolution, and other conditions may make it difficult or impossible to precisely scan the geofiducials 508 in order to extract useful information from them.

Returning to FIG. 4, the method 400 then proceeds to a for-loop defined between a for-loop start block 406 and a for-loop end block 412, wherein each image of the plurality of images is processed to add it to a set of training data.

From the for-loop start block 406, the method 400 proceeds to block 408, where the imagery collection engine 312 collects ground truth pixel labels for the image. In some embodiments, the imagery collection engine 312 may generate a user interface that presents the image to a user, and the user may select pixel labels for the pixels of the image using any suitable technique, including but not limited to drawing outlines around groups of pixels and then assigning pixel labels to the pixels within the outlined shapes. In some embodiments, the imagery collection engine 312 may submit the image for tagging to a crowd computing platform, such as the Crowdsource app by Google Inc., or Mechanical Turk by Amazon Technologies, Inc.

Figure 5B:
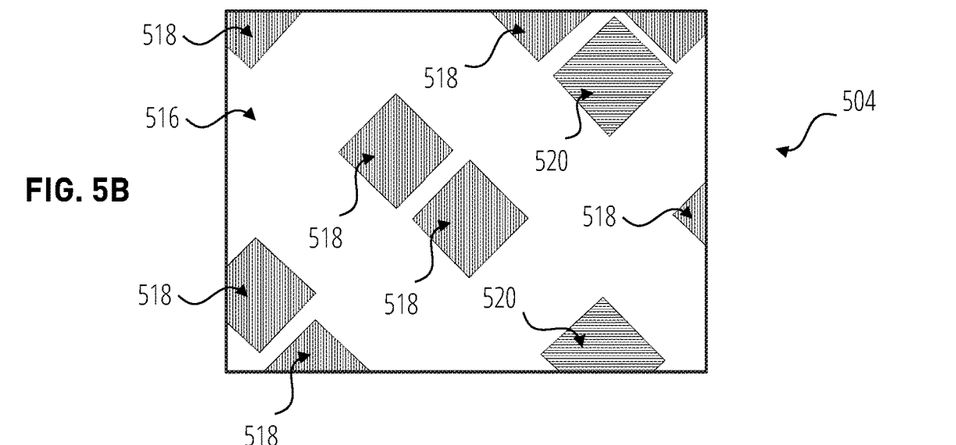

FIG. 5B illustrates an example of ground truth pixel labels 504 applied to the image 502. The unoccupied landing spaces 510 have been labeled with unoccupied landing space pixel ground truth labels 518, and the occupied landing spaces 514 have been labeled with occupied landing space pixel ground truth labels 520. The remainder of the pixels have been labeled with non-landing space pixel ground truth labels 516. In some embodiments, instead of using non-landing space pixel ground truth labels 516, any pixel not labeled as an occupied landing space pixel or an unoccupied landing space pixel may be assumed to be a non-landing space pixel.

Returning again to FIG. 4, at block 410, the imagery collection engine 312 stores the ground truth pixel labels in association with the image in a training data set in the imagery data store 314. The method 400 then proceeds to the for-loop end block 412. If further images remain to be processed, then the method 400 returns to for-loop start block 406 to process the next image. Otherwise, if all of the images have been processed, the method 400 proceeds to block 414.

At block 414, a model management engine 316 of the model management computing system 310 trains a machine learning model based on the training data set in the imagery data store 314. Any suitable type of machine learning model that can be trained to generate a pixel-by-pixel segmentation for an input image may be used. In some embodiments, an encoder-decoder model may be used. The encoder-decoder model may use any suitable architecture, including but not limited to a MobileNet model as an encoder, for which the generated features are then combined and rebuilt into a new image by the decoder. Any suitable training technique, including but not limited to gradient descent and/or an Adam optimizer, may be used.

In some embodiments, the features provided to the machine learning model during training may include the telemetry information provided by the UAV 200 that captured the images. In some embodiments, more than one image may be provided at once to the machine learning model. For example, a sequence of consecutively captured images (e.g., images captured at time t−1, . . . , t−n) may be provided as the input to the machine learning model so that the machine learning model can be trained to more easily handle uncertainty caused by transient conditions when analyzing a given image (e.g., an image captured at time t).

In some embodiments, the images used for training in the method 400 may be thoughtfully collected in order to ensure the highest possible performance of the trained machine learning model. For example, in some embodiments, the training data may be organized into buckets by altitude (e.g., a 0-5 meter altitude bucket, a 5-10 meter altitude bucket, a 10-15 meter altitude bucket, etc., or any other suitable ranges), and appropriate amounts (e.g., equal amounts or approximately equal amounts) of training data may be selected from each bucket to ensure that the trained machine learning model will have adequate performance at a variety of altitudes. As another example, in some embodiments, a significant amount (e.g., 50% or more) of the training data may not depict any landing spaces, thus allowing the machine learning model to learn the distinctive features present at landing spaces that are not present elsewhere.

Figure 5C:
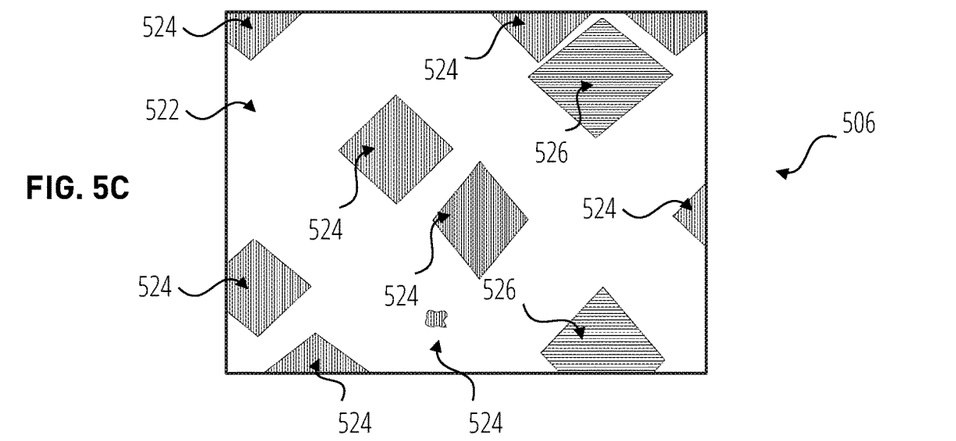

FIG. 5C illustrates a result of processing the image 502 with the trained machine learning model. As shown, the pixel labels 506 include unoccupied landing space pixel labels 524 for the unoccupied landing spaces 510, occupied landing space pixel labels 526 for the occupied landing spaces 514, and non-landing space pixel labels 522 for the remainder of the pixels. One will note that the size and shape of the pixel labels are slightly different than the actual sizes and shapes of the landing spaces to illustrate the uncertainty that may be present along the edges of the labeled areas. One will also note a small area of pixels that was mislabeled as unoccupied landing space pixel labels 524 due to the presence of the shadow 512 in the image 502. Despite the uncertainty along the edges and the small area of mislabeled pixels, the UAV 200 can use various heuristics to accurately identify the locations of the landing spaces as described below in the description of FIG. 7.

Returning to FIG. 4, at block 416, the model management engine 316 stores the trained machine learning model in a model data store 308 of the model management computing system 310. In some embodiments, once trained, the machine learning model may be sparsified before storage in the model data store 308 in order to improve performance speed of the machine learning model during processing on the UAVs 200. The method 400 then proceeds to an end block and terminates.

In some embodiments, the landing spaces which the machine learning model is trained to label are charging pads. Charging pads may have a surface texture, an internal structure, a pattern of conductors, or other features that are visible in various lighting conditions and from various angles that are suitable for segmentation by the machine learning model and are a desirable location for landing. While detection of charging pads is a particularly useful embodiment, it should not be seen as limiting, and in other embodiments, other types of landing spaces may be detected.

Figure 6A:
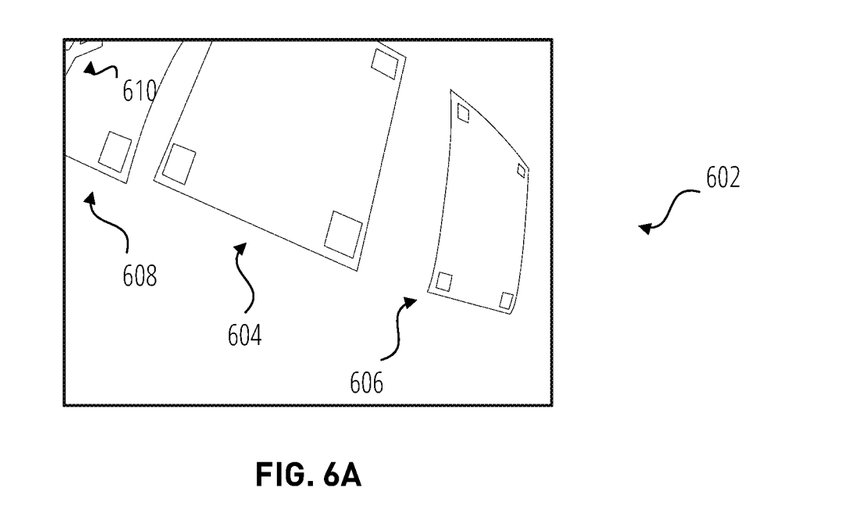
FIG. 6A-FIG. 6B illustrate the application of pixel labels to an aerial image taken from an oblique angle with respect to several landing spaces according to various aspects of the present disclosure.
Figure 6B:
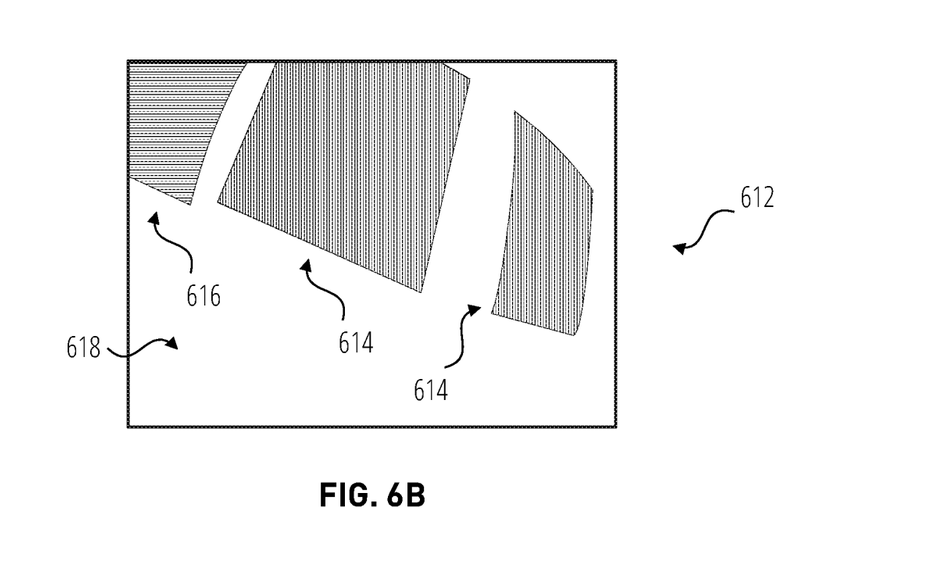

FIG. 6A-FIG. 6B illustrate the application of pixel labels to an aerial image taken from an oblique angle with respect to several landing spaces according to various aspects of the present disclosure. These images illustrate more reasons why the image segmentation problem for landing spaces is difficult in the UAV imagery context and is better served using the pixel-by-pixel segmentation described above than with a more common object detector.

In FIG. 6A, an oblique image 602 is shown, which may be obtained by a UAV 200 at a low altitude and positioned to the side of a first landing space 604, a second landing space 606, and a third landing space 608. Landing spaces may be a standard shape (such as square) and a standard size (such as a meter wide). While it would seem that an object detector would have an easy time detecting such standard shapes, FIG. 6A illustrates why it is nevertheless difficult: the first landing space 604, second landing space 606, and third landing space 608 all appear different sizes and shapes due to the distortion caused by the low altitude. Specifically, the edges of the second landing space 606 are distorted to appear as curved lines and to be out of square, which would therefore be unlikely to be successfully identified by an object detector. Further, the third landing space 608 is mostly outside of the frame of the oblique image 602, and so would also be unlikely to be successfully identified by an object detector. The object detector is similarly unlikely to detect the UAV 610 present on the third landing space 608 because it is mostly outside of the frame of the oblique image 602. One will recognize that an additional difficulty will be added by the fact that the UAV 200 may be in a variety of rotational attitudes with respect to the landing spaces, and so a large amount of training data in different rotational arrangements would need to be provided to train an object detector, which may not be able to successfully be trained.

FIG. 6B illustrates the result of processing the oblique image 602 with the machine learning model trained by the method 400 described above. As shown, pixel labels 612 are correctly applied to each of the landing spaces, with unoccupied landing space pixel labels 614 being applied to the first landing space 604 and the second landing space 606, occupied landing space pixel labels 616 being applied to the third landing space 608, and non-landing space pixel labels 618 applied to the remainder of the pixels. Since the machine learning model is trained to perform a pixel-by-pixel segmentation, the oblique angle and the distorted shapes do not affect the segmentation.

Figure 7:
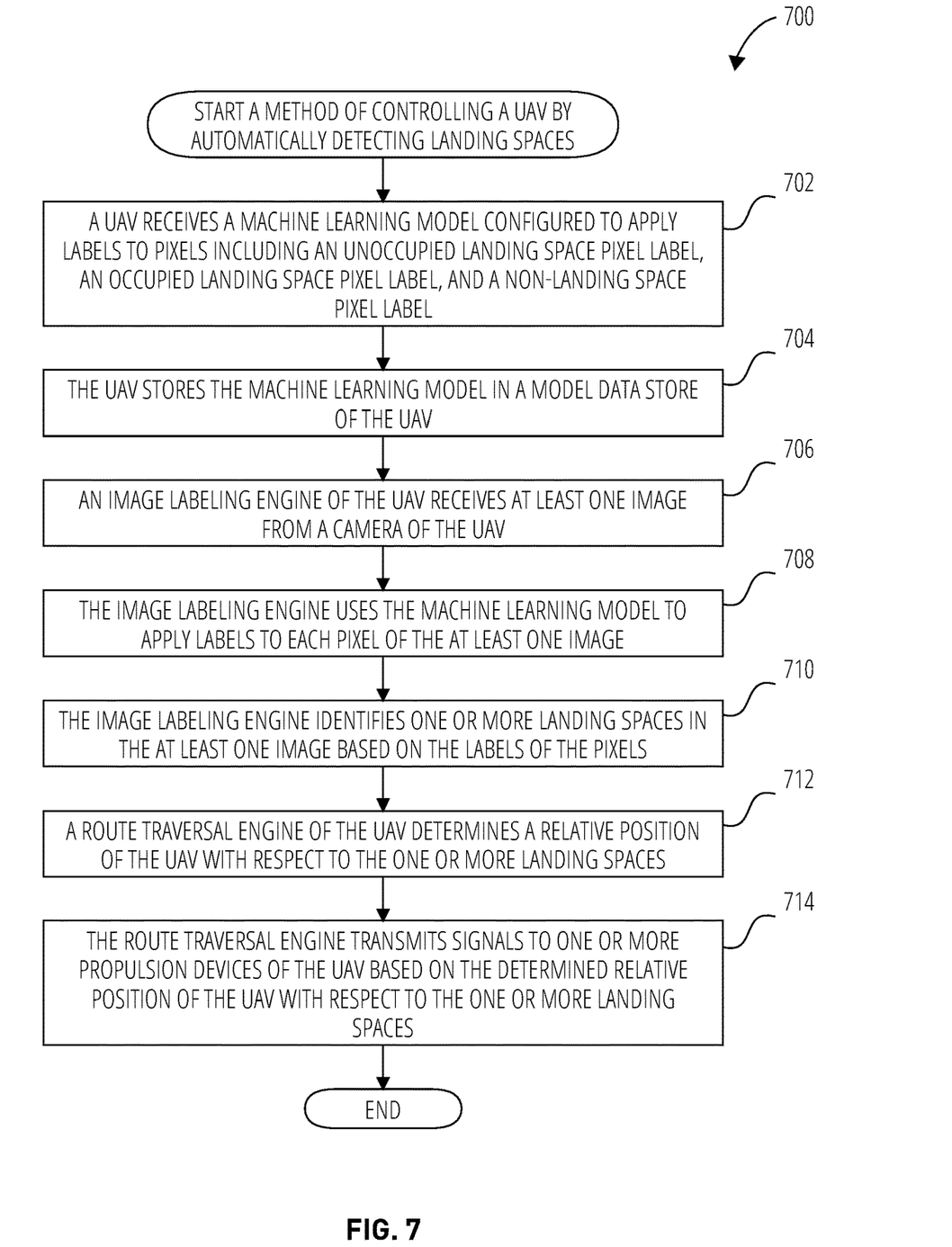
FIG. 7 is a flowchart that illustrates a non-limiting example embodiment of a method of controlling a UAV by automatically detecting landing spaces according to various aspects of the present disclosure.

FIG. 7 is a flowchart that illustrates a method of controlling a UAV by automatically detecting landing spaces according to various aspects of the present disclosure. The method 700 uses the machine learning model trained by the method 400 described above to detect landing spaces, and uses the detected landing spaces to determine and apply control strategies for the UAV.

From a start block, the method 700 proceeds to block 702, where a UAV 200 receives a machine learning model configured to apply labels to pixels including an unoccupied landing space pixel label, an occupied landing space pixel label, and a non-landing space pixel label. The machine learning model may be received from the model management computing system 310, and may be trained using the method 400 described above or by any other suitable method. At block 704, the UAV 200 stores the machine learning model in a model data store 214 of the UAV 200.

At block 706, an image labeling engine 216 of the UAV 200 receives at least one image from a camera of the UAV 200. In some embodiments, the image labeling engine 216 may receive the image at some point during the flight of the UAV 200, such as shortly after takeoff while hovering over the nest, during cruise, or shortly before landing while again located over the nest.

At block 708, the image labeling engine 216 uses the machine learning model to apply labels to each pixel of the at least one image. In some embodiments, the image labeling engine 216 may provide the image as input to the machine learning model, and the machine learning model may produce a pixel-by-pixel labeling of the image. In some embodiments, the image labeling engine 216 may provide telemetry information, including but not limited to a heading, a pitch, a yaw, and an altitude of the UAV 200 as additional input to the machine learning model along with the image. In some embodiments, the image labeling engine 216 may provide more than one image, such as a set of consecutively captured images, as input to the machine learning model (e.g, images captured at time t–1, . . . , t–n to help label pixels in an image captured at time t).

At block 710, the image labeling engine 216 identifies one or more landing spaces in the at least one image based on the labels of the pixels. In some embodiments, the image labeling engine 216 may perform post-processing on the image labels in order to increase their fidelity. For example, the image labeling engine 216 may perform morphological closing, smoothing, or other operations in order to eliminate holes and irregularities in the labeled areas.

Instead of or in addition to the post-processing steps, the image labeling engine 216 may apply one or more heuristics in order to detect landing spaces. For example, the image labeling engine 216 may determine a minimum number of pixels that would be present in a landing space based on an altitude of the UAV 200, and may ignore groups of pixels that are labeled as a landing space that are smaller than the determined minimum number of pixels. As another example, the image labeling engine 216 may determine a rough shape that the landing space should appear as based on a pose of the UAV 200, and may ignore groups of labeled pixels that are not within a threshold similarity of the expected shape. As another example, the image labeling engine 216 may determine a proportion of pixels that should be labeled as an unoccupied landing space as opposed to an occupied landing space in order to confirm that a landing space is an unoccupied landing space (e.g., at least 70% of contiguous pixels labeled as a landing space should be labeled as unoccupied instead of occupied, or any other suitable threshold value), otherwise the landing space is identified as an occupied landing space. By using such heuristics, the method 700 can avoid misidentifying groups of pixels such as the small group of unoccupied landing space pixel labels 524 of FIG. 5C associated with the shadow 512 of FIG. 5A. In some embodiments, the image labeling engine 216 may label pixels in multiple consecutively captured images, and may identify landing spaces based on whether the labels have remained consistent for at least a threshold amount of time in order to avoid incorrectly identifying landing spaces due to transient artifacts in the images.

At block 712, a route traversal engine 218 of the UAV 200 determines a relative position of the UAV 200 with respect to the one or more landing spaces. In some embodiments, the route traversal engine 218 may compensate for uncertainty near the edges of the pixels labeled as landing spaces by computing a centroid of the group of labeled pixels, and using the centroid as the location of each landing space. The UAV 200 can then use the heading, pitch, yaw, and/or altitude of the UAV 200 to determine the relative position of the UAV 200 with respect to each landing space. In some embodiments, the route traversal engine 218 may use an apparent size of the one or more landing spaces, apparent distances between the one or more landing spaces, or other characteristics of the one or more landing spaces and/or their determined positions in order to estimate an altitude of the UAV 200.

At block 714, the route traversal engine 218 transmits signals to one or more propulsion devices 210 of the UAV 200 based on the determined relative position of the UAV 200 with respect to the one or more landing spaces. Once the relative position has been determined, the route traversal engine 218 can use the information for various tasks.

For example, in some embodiments, the route traversal engine 218 is configured to cause the UAV 200 to hover in a fixed position while performing various pre-mission calibration and safety checks. Accordingly, the route traversal engine 218 may use the determined relative position as a reference for a stationary hover, and may generate signals to the one or more propulsion devices 210 to maintain a fixed relative position with respect to the one or more landing spaces. Advantageously, this allows the UAV 200 to maintain its stationary hover regardless of whether a GNSS system is functional at the time.

As another example, in some embodiments, the route traversal engine 218 can use the identified unoccupied landing spaces to choose a landing space at which to land, and the route traversal engine 218 can plan a navigation path to the determined position of the selected unoccupied landing space, and can then transmit signals to the one or more propulsion devices 210 to traverse the navigation path to the selected unoccupied landing space. This allows the UAV 200 to safely choose and land at a landing space in a nest that may be concurrently used by other UAVs 200 without having to reserve a landing space prior to planning the mission, and without having to communicate with any other UAVs 200 or fleet management systems.

The method 700 then proceeds to an end block and terminates. Though FIG. 7 illustrates the method 700 as ending here for the sake of clarity, in some embodiments, the method 700 may continue to process images, detect landing spaces, and transmit signals to the propulsion devices 210 based thereon for a remainder of the duration of a flight cycle of the UAV 200.

In the preceding description, numerous specific details are set forth to provide a thorough understanding of various embodiments of the present disclosure. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The order in which some or all of the blocks appear in each method flowchart should not be deemed limiting. Rather, one of ordinary skill in the art having the benefit of the present disclosure will understand that actions associated with some of the blocks may be executed in a variety of orders not illustrated, or even in parallel.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A non-transitory computer-readable medium having computer-executable instructions stored thereon that, in response to execution by one or more processors of an unmanned aerial vehicle (UAV), cause the UAV to perform actions comprising:
   capturing at least one image using a camera of the UAV;
   generating labels for pixels of the at least one image by providing the at least one image as input to a machine learning model, wherein the labels include an unoccupied landing space pixel label, an occupied landing space pixel label, and a non-landing space pixel label;
   identifying one or more landing spaces in the at least one image based on the labels;
   determining a relative position of the UAV with respect to the one or more landing spaces; and
   transmitting signals to one or more propulsion devices of the UAV based on the relative position of the UAV with respect to the one or more landing spaces, wherein the signals cause the UAV to autonomously execute a maneuver, and wherein the maneuver is a stationary hover or a landing in an unoccupied landing space.

2. The non-transitory computer-readable medium of claim 1, wherein the maneuver is the landing in the unoccupied landing space, and wherein the actions further comprise:
   identifying the unoccupied landing space from the one or more landing spaces as an endpoint of a navigation path; and
   determining control signals for causing the UAV to transit the navigation path and land at the unoccupied landing space;
   wherein transmitting the signals to the one or more propulsion devices of the UAV includes transmitting the determined control signals.

3. The non-transitory computer-readable medium of claim 1, wherein the maneuver is the stationary hover, and wherein the actions further comprise:
   determining control signals for causing the UAV to hover in a constant position in relation to the position of one or more landing spaces; and
   wherein transmitting the signals to the one or more propulsion devices of the UAV includes transmitting the determined control signals.

4. The non-transitory computer-readable medium of claim 1, wherein determining the position of one or more landing spaces based on the labels for the pixels of the at least one image includes identifying at least one group of pixels having unoccupied landing space pixel labels or occupied landing space pixel labels as being landing spaces based on one or more heuristics.

5. The non-transitory computer-readable medium of claim 4, wherein the one or more heuristics include one or more of meeting a minimum size threshold, having a predetermined shape, and having a minimum number of pixels with occupied landing space pixel labels over a predetermined amount of time.

6. The non-transitory computer-readable medium of claim 1, wherein generating labels for pixels of the at least one image further includes providing one or more of a heading, a pitch, a yaw, and an altitude of the UAV as additional input to the machine learning model.

7. The non-transitory computer-readable medium of claim 1, wherein the actions further comprise determining an altitude of the UAV based on the position of the one or more landing spaces.

8. The non-transitory computer-readable medium of claim 1, wherein providing the at least one image as input to a machine learning model includes providing a plurality of images as input to the machine learning model that include an image captured at a time t and one or more images captured before time t in order to generate labels for pixels in the image captured at the time t.

9. The non-transitory computer-readable medium of claim 1, wherein the machine learning model is an encoder-decoder machine learning model.

10. The non-transitory computer-readable medium of claim 1, wherein each landing space is a charging pad.

11. An unmanned aerial vehicle (UAV), comprising:
one or more processors;
a camera;
one or more propulsion devices; and
a non-transitory computer-readable medium having computer-executable instructions stored thereon that, in response to execution by the one or more processors, cause the UAV to perform actions comprising:
receiving at least one image captured by the camera;
generating labels for pixels of the at least one image by providing the at least one image as input to a machine learning model, wherein the labels include an unoccupied landing space pixel label, an occupied landing space pixel label, and a non-landing space pixel label;
identifying one or more landing spaces in the at least one image based on the labels;
determining a relative position of the UAV with respect to the one or more landing spaces; and
transmitting signals to the one or more propulsion devices based on the relative position of the UAV with respect to the one or more landing spaces.

12. The UAV of claim 11, wherein the actions further comprise:
identifying an unoccupied landing space of the one or more landing spaces as an endpoint of a navigation path; and
determining control signals for causing the UAV to transit the navigation path and land at the unoccupied landing space;
wherein transmitting the signals to the one or more propulsion devices of the UAV includes transmitting the determined control signals.

13. The UAV of claim 11, wherein the actions further comprise:
determining control signals for causing the UAV to hover in a constant position in relation to the position of one or more landing spaces;
wherein transmitting the signals to the one or more propulsion devices of the UAV includes transmitting the determined control signals.

14. The UAV of claim 11, wherein determining the position of one or more landing spaces based on the labels for the pixels of the at least one image includes identifying at least one group of pixels having unoccupied landing space pixel labels or occupied landing space pixel labels as being landing spaces based on one or more heuristics.

15. The UAV of claim 14, wherein the one or more heuristics include one or more of meeting a minimum size threshold, having a predetermined shape, and having a minimum number of pixels with occupied landing space pixel labels over a predetermined amount of time.

16. The UAV of claim 11, wherein generating labels for pixels of the at least one image further includes providing one or more of a heading, a pitch, a yaw, and an altitude of the UAV as additional input to the machine learning model.

17. The UAV of claim 11, wherein the actions further comprise determining an altitude of the UAV based on the position of the one or more landing spaces.

18. The UAV of claim 11, wherein providing the at least one image as input to a machine learning model includes providing a plurality of images as input to the machine learning model that include an image captured at a time t and one or more images captured before time t in order to generate labels for pixels in the image captured at the time t.

19. The UAV of claim 11, wherein the machine learning model is an encoder-decoder machine learning model.

20. The UAV of claim 11, wherein each landing space is a charging pad.

* * * * *